(12) United States Patent
Wei et al.

(10) Patent No.: US 8,533,829 B2
(45) Date of Patent: *Sep. 10, 2013

(54) METHOD FOR MONITORING MANAGED DEVICE

(75) Inventors: Wei Wei, Beijing (CN); Yadong Qu, Beijing (CN); Jun Chen, Beijing (CN)

(73) Assignee: Beijing Lenovo Software Ltd., Beijing (CN)

( * ) Notice: Subject to any disclaimer, the term of this patent is extended or adjusted under 35 U.S.C. 154(b) by 850 days.

This patent is subject to a terminal disclaimer.

(21) Appl. No.: 11/817,194

(22) PCT Filed: Dec. 8, 2005

(86) PCT No.: PCT/CN2005/002123
§ 371 (c)(1),
(2), (4) Date: Dec. 18, 2007

(87) PCT Pub. No.: WO2006/089472
PCT Pub. Date: Aug. 31, 2006

(65) Prior Publication Data
US 2008/0250501 A1    Oct. 9, 2008

(30) Foreign Application Priority Data
Feb. 28, 2005 (CN) .......................... 2005 1 0051118

(51) Int. Cl.
*H04L 29/06* (2006.01)
*G06F 21/00* (2006.01)

(52) U.S. Cl.
USPC ............... 726/23; 726/22; 726/24; 726/26; 726/27; 726/28; 726/29; 726/30; 713/1; 713/2; 713/100; 713/164; 713/168; 713/169; 713/170; 713/187; 713/188; 709/219; 709/220; 709/221; 709/222; 709/224

(58) Field of Classification Search
USPC ............ 726/22–30; 713/175–181, 1, 2, 713/100, 187, 188, 164–167; 709/217–229
See application file for complete search history.

(56) References Cited

U.S. PATENT DOCUMENTS

| 5,954,797 A | 9/1999 | Sidey ............................ 709/223 |
| 6,185,678 B1 * | 2/2001 | Arbaugh et al. .................. 713/2 |

(Continued)

FOREIGN PATENT DOCUMENTS

| JP | 2008522292 | 6/2008 |
| JP | 2002092221 | 3/2009 |
| WO | WO 2006/135905 A2 | 12/2006 |

OTHER PUBLICATIONS

Handbook of Applied Cryptography by Menezes et al; Year: 1996; Publisher: CRC Press.*

(Continued)

*Primary Examiner* — Madhuri Herzog
(74) *Attorney, Agent, or Firm* — Westman, Champlin & Kelly, P.A.

(57) ABSTRACT

A method for monitoring the managed devices comprises that the manage center preserves the integrality list in advance, which includes the system integrality values of the managed devices and the corresponding relations of the managed devices and the system integrality values of themselves, and the managed device gathers the current system integrality value of itself and saves it when it starts; the managed device sends the information including the current system integrality value to the manage center after receiving the monitor command from the manage center; the manage center determines whether the received current system integrality value of the managed device coincides with the integrality value of the managed device saved by itself according to the received information and said integrality list, and implements the alert process when they do not coincide with each other. The manage center can know whether the managed device is believable currently so that the manage center can determine whether the unknown attack to the managed device exists or not according to the present invention.

11 Claims, 2 Drawing Sheets

(56) References Cited

U.S. PATENT DOCUMENTS

| | | | |
|---|---|---|---|
| 6,681,331 B1 | 1/2004 | Munson et al. | 713/201 |
| 7,475,427 B2* | 1/2009 | Palliyil et al. | 726/24 |
| 2002/0066009 A1* | 5/2002 | Tung | 713/1 |
| 2002/0099666 A1 | 7/2002 | Dryer et al. | 705/71 |
| 2003/0028761 A1* | 2/2003 | Platt | 713/150 |
| 2003/0120953 A1* | 6/2003 | Radatti | 713/201 |
| 2003/0221114 A1* | 11/2003 | Hino et al. | 713/189 |
| 2004/0083375 A1* | 4/2004 | Foster et al. | 713/189 |
| 2004/0250167 A1* | 12/2004 | Sato et al. | 714/38 |
| 2005/0257272 A1* | 11/2005 | Nakao | 726/26 |
| 2005/0289347 A1* | 12/2005 | Ovadia | 713/171 |
| 2006/0143271 A1* | 6/2006 | Murphy et al. | 709/206 |
| 2009/0217377 A1* | 8/2009 | Arbaugh et al. | 726/23 |

OTHER PUBLICATIONS

Personal Secure Booting by Itoi et al; Publisher: Springer Verlag Berlin Heidelberg; Year: 2001.*

Privacy and Trusted Computing by Reid et al; Publisher: IEEE; Year: 2003.*

"Trusted Platform on Demand", 197043, 2004/3/5, 7 pages.

Document 2, Citation 2, 197044; 22/3/23, Network Guide Dec. 2004, 8 pages.

Document 3, Reference 3, 197045, Apr. 2004, 8 pages.

Examination Report under Section 18(3) for Application No. GB0718762.8; date of report Oct. 14, 2009; one page.

* cited by examiner

METHOD FOR MONITORING MANAGED DEVICE

CROSS-REFERENCE TO RELATED APPLICATION

This Application is a Section 371 National Stage Application of International Application No. PCT/CN2005/002123, filed Dec. 8, 2005 and published as WO 2006/089472 on Feb. 28, 2005, not in English, the contents of which is hereby incorporated by reference in its entirety.

BACKGROUND OF THE INVENTION

1. Field of Invention

The present invention relates to the field of monitoring technology and trusted computer, and in particular to a method for monitoring a managed device.

2. Description of Prior Art

Currently, a management center for managing a device is usually a server which is responsible for acquiring the information on the managed device, such as the log event of the managed device, running load for CPU, current network performance and attacks that have happened. The management center launches an alert when found the managed device is under attack. Unfortunately, the information monitored by the management center is confined to only the information of some specific modules or components in the managed device as well as known attacks, while the current status of the managed device and any unknown attack cannot be monitored.

Therefore, it is obvious that the prior art monitoring is restricted to only the monitoring of any known attack, while there is no way to monitor any unknown attack and the current status of the managed device. Moreover, the management center cannot detect whether there exists any system vulnerability of the managed device.

SUMMARY OF THE INVENTION

It is an object of the present invention to provide a method for monitoring a managed device so that a management center can monitor whether there currently exists any unknown attack on the managed device.

To achieve the above object, the technical solution of the present invention is implemented as follows.

A method for monitoring a managed device, wherein a management center pre-saves an integrity list containing system integrity values of the managed device and the correspondence between the managed device and its system integrity values, and the managed device, upon started, acquires and saves its current system integrity value, the method comprises the steps of:

a) sending, by the managed device, information containing the current system integrity value to the management center after the reception of a monitoring command from the management center;

b) determining, by the management center, whether the current system integrity value of the managed device in the received information coincides with the saved system integrity value of the managed device in the management center based on the received information and said integrity list, and performing alert processing if they do not coincide with each other.

Preferably, said alert processing comprises issuing alert information, or issuing alert information and restoring damaged parameters.

Preferably, said integrity list further comprises application software equipped to each managed device and integrity value of the application software.

The method further comprises the steps of: calculating, by the managed device, the integrity value of application software and sending information containing the current integrity value of the application software to the management center before starting the application software; and determining, by the management center whether the received system integrity value of the application software currently used by the managed device coincides with the saved system integrity value of the application software corresponding to the managed device in the management center based on the received information and said integrity list, and issuing alert information, or issuing alert information and restoring the damaged application software if there is no coincidence.

Preferably, said management center pre-saves a list of operating system (OS) versions and/or a list of application software versions, said list of OS versions contains integrity values for different versions of different OSs and the correspondence between integrity values for different versions of one same OS; said list of application software versions contains integrity values for different versions of different application software and the correspondence between integrity values for different versions of one same application software; said list of OS versions further contains patches corresponding to OS versions having security vulnerability, and said list of application software versions further contains patches corresponding to application software versions having security vulnerability.

The step a) further comprises sending to the management center information containing the current integrity value for OS and/or for application software version. The step b) further comprises determining the OS and/or application software version currently used by the managed device based on the current integrity value for OS and/or for application software version from the managed device as well as said list of OS versions and/or of application software versions, determining whether there is any security vulnerability in the OS and/or application software version based on a preset configuration, and, if it is determined that there is any security vulnerability in the OS and/or application software version, issuing alert information and sending to the managed device the patch corresponding to the OS and/or application software version.

Preferably, said information containing the current system integrity value in the step a) is the plain text of the current system integrity value.

Preferably, said information containing the current system integrity value in the step a) is the encrypted text obtained by encrypting the current system integrity value with a preset symmetrical key.

Before said determining by the management center based on the received information and said integrity list, the step b) further comprises decrypting the received information with a preset symmetrical key.

Preferably, said information containing the current system integrity value in the step a) is the plain text of the current system integrity value and the information obtained by signing the current system integrity value with a pre-generated private key.

Before said determining by the management center based on the received information and said integrity list, the step b) further comprises verifying the signature on the current system integrity value with a pre-saved public key corresponding to said private key in the step a).

Preferably, said information containing the current system integrity value in the step a) is the combined information of the plain text of the current system integrity value, the information obtained by signing the current system integrity value with a pre-generated private key, and a pre-generated public key certificate corresponding to said private key and signed by a trusted third party.

Before said determining by the management center based on the received information and said integrity list, the step b) further comprises verifying the signature on the current system integrity value with the received public key.

Preferably, said information containing the current system integrity value in the step a) is the combined information of the plain text of the current system integrity value, the information obtained by signing the current system integrity value with a pre-generated private key, a pre-generated public key corresponding to said private key and an anonymous certificate.

Before said determining by the management center based on the received information and said integrity list, the step b) further comprises authenticating the identity of the sender with the received anonymous certificate and verifying the signature on the current system integrity value with the received public key after a successful authentication.

Preferably, said managed device is a computer, and the step of said managed device acquiring and saving its current system integrity value upon started comprises the steps of:

i) calculating integrity values for system ROM, BIOS or EFI firmware code and hardware configuration parameters and storing them in a secure storage component after powering on the computer;

ii) calculating integrity values for parameter information which has been configured, master boot sector and system boot partition and storing them in a secure storage component after starting BIOS or EFI;

iii) calculating integrity value for OS-loaded code and storing it in a secure storage component before loading the boot OS by BIOS or EFI;

iv) calculating integrity values for OS core, system startup file, system configuration file and driving software and storing them in a secure storage component after loading code by OS;

v) calculating the current system integrity value based on all the integrity values mentioned in the steps i) to iv).

Preferably, said parameter information which has been configured includes CPU microcode software, enable or disable status configuration for various system functions, various authentication passwords, disk configuration parameters, configuration parameters for peripheral devices and configure parameters for security function.

Preferably, said secure storage component is secure chip TPM, hard disk with security protection function, USB-key or smart-card.

The pivotal concept of the present invention is explained as follows. The management center pre-saves the integrity list containing system integrity values of the managed device and the correspondence between the managed device and its system integrity values, and the managed device, upon started, acquires and saves its current system integrity value; the managed device sends information containing the current system integrity value to the management center after the reception of a monitoring command from the management center; the management center determines whether the received current system integrity value of the managed device coincides with the saved system integrity value of the managed device in the management center based on the received information and said integrity list, and performs alert processing if they do not coincide with each other. With the present invention, the management center can learn whether the managed device is currently in a trusted status. If the managed device is currently in an untrusty status, it is indicated that a potential attack exists, and thus the management center is enable to determine whether any unknown attack on the managed device exists. Further, the present invention monitors the application software currently used by the managed device and thereby determines whether the application software is under attack or damaged. In addition, the present invention monitors the OS version of the managed device and determines whether there is any vulnerability in the current OS of the managed device and whether a patch is needed.

DETAILED DESCRIPTION OF THE PREFERRED EMBODIMENTS

The idea of the present invention is that a management center pre-saves an integrity list containing system integrity values of a managed device and the correspondence between the managed device and its own system integrity values, and the managed device, upon started, acquires and saves its own current system integrity value; the managed device sends information containing the current system integrity value to the management center after the reception of a monitoring command from the management center; the management center determines whether the received current system integrity value of the managed device coincides with the saved system integrity value of the managed device in the management center based on the received information and said integrity list, and performs alert processing if they do not coincide with each other.

Figure 1:
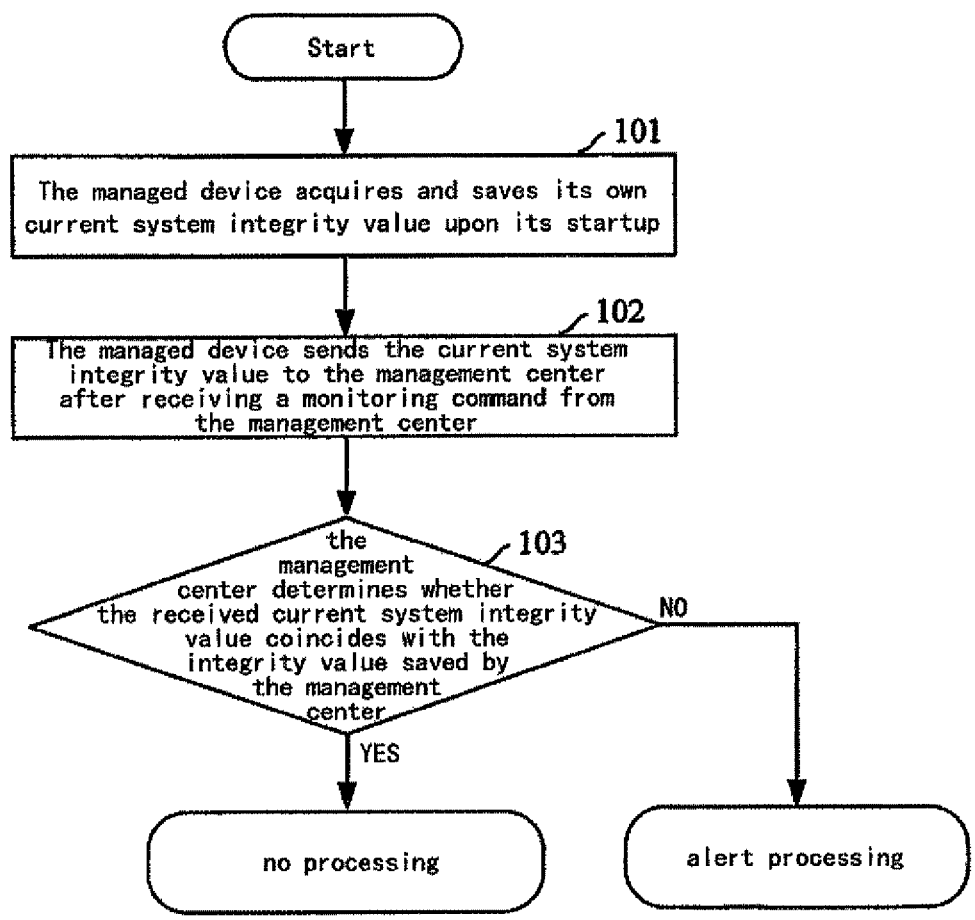
FIG. 1 shows a schematic flowchart for implementing an embodiment of the present invention.

FIG. 1 shows a schematic flowchart for implementing an embodiment of the present invention. A management center pre-saves an integrity list containing system integrity values of a managed device and the correspondence between the managed device and its own system integrity values.

In step 101, the managed device acquires and saves its own current system integrity value when it is started.

In step 102, the managed device sends information containing the current system integrity value to the management center after receiving a monitoring command from the management center.

In step 103, the management center determines whether the received system integrity value of the managed device coincides with the saved system integrity value of the managed device in the management center based on the received information and said integrity list. If the two values coincide with each other, the managed device operates normally and in a trusted status, and thus the management center conducts no processing. If there lacks coincidence between the two values, the management center considers the managed device to be in an untrusty status and carries out alert processing.

The above-mentioned untrusty status includes, but not limited to, firmware and various system parameters being damaged. The above alert processing includes sending alert information, or send alert information and restoring the damaged parameters.

In this way, the monitoring on the managed device can be implemented.

Figure 2:
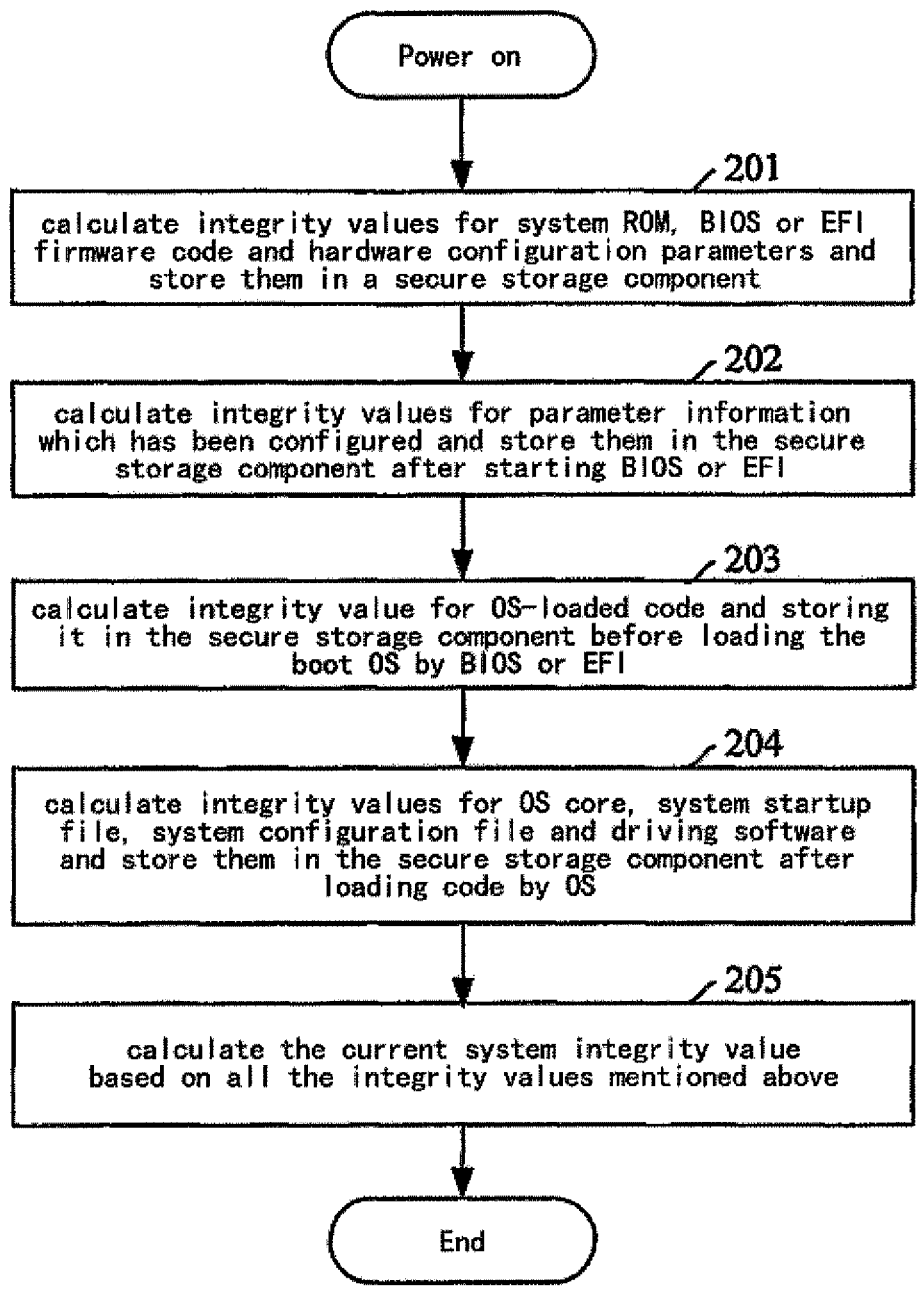
FIG. 2 shows a schematic flowchart for a device to be accessed calculating its own system integrity value.

Referring to FIG. 2, which shows a schematic flowchart for a managed device to acquire its own system integrity value. In this embodiment, the managed device is a computer.

In step 201, every time the computer is powered on, it utilizes CPU to calculate integrity values for system ROM, basic input-output system (BIOS) or the firmware code of extensible firmware interface (EFI) and hardware configuration parameters, and stores these integrity values in a secure storage component.

In step 202, after BIOS or EFI has been started, the computer calculates integrity values for parameter information which has been configured, master boot sector and system boot partition and stores them in the secure storage component. The parameter information which has been configured includes CPU microcode software, enable or disable status configuration for various system functions, various authentication passwords, disk configuration parameters, configuration parameters for peripheral devices, configuration parameters for security function, etc.

In step 203, the computer calculates integrity value for OS-loaded code and stores it in the secure storage component before the boot OS is loaded by BIOS or EFI.

In step 204, the computer calculates integrity values for OS core, system startup file, system configuration file and driving software and stores them in the secure storage component after the code has been loaded by OS.

In step 205, the computer calculates the current system integrity value based on all the integrity values mentioned in the step 201 to 204.

The secure storage component mentioned above is secure chip (TPM, Trusted platform Module), hard disk with security protection function, USB-key or smart-card.

In this embodiment, the integrity list can further include application software equipped to each managed device and integrity value of the application software. After the managed device has a normal startup and before the application software is started, the following steps can be included. First, the managed device calculates the integrity value of the application software and sends information containing the current integrity value of the application software to the management center. The management center then determines, based on the received information and the integrity list, whether the received system integrity value of the application software currently used by the managed device coincides with the saved system integrity value of the application software corresponding to the managed device in the management center. If the two values coincide with each other, the managed device operates normally, and thus the management center conducts no processing. If there lacks coincidence between the two values, the management center considers the application software has been damaged and issues alert information, or issues alert information as well as restores the damaged application software.

Besides, a list of operating system (OS) versions and/or a list of application software versions can be provided in the management center in advance. The list of OS versions contains integrity values for different versions of different OSs and the correspondence between integrity values for different versions of one same OS, and the list of application software versions contains integrity values for different versions of different application software and the correspondence between integrity values for different versions of one same application software. Meanwhile, the list of OS versions and the list of application software versions further contain patches corresponding to OS versions and application software versions having security vulnerability, respectively. Upon the reception of a monitoring command from the management center, the managed device sends to the management center information containing the current integrity value for OS and/or for application software version in addition to the above current system integrity value. The management center, after determining the managed device is in a normal status, determines the OS and/or application software version currently used by the managed device based on the current integrity value for OS and/or for application software version from the managed device as well as the list of OS versions and/or of application software versions, and determines whether there is any security vulnerability in the OS and/or application software version based on a preset configuration. If it is determined that there is any security vulnerability in the OS and/or application software version, the management center sends to the managed device the patch corresponding to the OS and/or application software version, otherwise it takes no action.

Next, a specific description will be given by example of OS since the management procedure for OS versions is the same as that for application software versions.

For example, information on the integrity values for 3 Windows2000 OS versions is saved in advance in the list of OS versions in the management center, as shown in Table 1.

TABLE 1

| | Version information | | | |
|---|---|---|---|---|
| OS | Version 1 | Patch to Version 1 | Version 2 | Version 3 |
| WINDOWS 2000 | Integrity value for original version | Patch to original version | Integrity value for original version installed with patch | Integrity value for latest version |
| ... | ... | ... | ... | ... |

Having received the integrity value for the OS version from the managed device, the management center sends alert information and the patch corresponding to the original version to the managed device if it confirms that the received integrity value is identical with its saved integrity value for the original WINDOWS2000 version, i.e. Version 1. On the other hand, if it confirms that the received integrity value is consistent with the integrity value for the patched original WINDOWS2000 version, that is, Version 2, or with the integrity value for the latest WINDOWS2000 version, Version 3, the management center concludes that the OS is normal and takes no action.

In the above monitoring procedure, the managed device sends to the management center the information, such as the integrity values for the current OS, the application software and the OS version, directly in the form of plain text. Of course, the managed device can also protect the information to be sent with a key or signature before sending it to the management center. Hereafter, the protected information sending mechanism using a key or signature will be explained in detail by example of sending the integrity value for the current OS.

The Protection Mechanism using a Key

A symmetrical key is pre-stored in the management center and the managed device, respectively. The managed device encrypts the current system integrity value with the symmetrical key and then sends the resulting information to the management center, which in turn decrypts the received information and carries out integrity determination when the decryption is successfully completed.

The Protection Mechanism using a Signature

The managed device generates a public key and a private key in advance, and then uses the latter to sign the current system integrity value. The management center uses the public key to verify the signature and carries out integrity determination when the verification is successful.

The information sent from the managed device to the management center needs to contain only the plain text of the current system integrity value and the signature thereon if the public and private keys generated in advance by the managed device has been signed by a trusted third party, and the management center has saved the public key corresponding to the private key. On the other hand, the information sent from the managed device to the management center needs to contain the plain text of the current system integrity value and the signature thereon as well as the public key corresponding to the private key used for signature if the public and private keys generated in advance by the managed device has been signed by a trusted third party, while the management center has not yet saved the public key corresponding to the private key. Further, if the public and private keys generated in advance by the managed device are not signed by a trusted third party, the information sent from the managed device to the management center needs to contain the plain text of the current system integrity value and the signature thereon, the public key corresponding to the private key used for signature as well as an anonymous identity certificate. In this case, the management center will first authenticate the legality of the sender by the anonymous identity certificate, and verify the signature with the received public key only when the sender is legal.

The above-described calculation of the system integrity value is performed by an integrity information acquisition module within the managed device, and the encryption or signing is fulfilled by a signature encryption module within the managed device, which also receives the monitoring command from the management center. The information is sent to the management center by a management agent module. The management center is a server, whose verifying action is fulfilled by a built-in acquisition module for trusted information of the managed device, and whose alert processing is executed by a built-in event processing alert module.

The foregoing description gives only the preferred embodiments of the present invention and is not intended to limit the present invention in any way. Thus, any modification, substitution, improvement or like made within the spirit and principle of the present invention should be encompassed by the scope of the present invention.

What is claimed is:

1. A method for monitoring a managed device, wherein a management center pre-saves an integrity list containing system integrity values of the managed device and the correspondence between the managed device and its own system integrity values, and the managed device acquires and saves its own current system integrity value upon its startup, said method comprises the steps of:
   a) sending, by the managed device, information containing the current system integrity value to the management center after the reception of a monitoring command from the management center; and
   b) determining, by the management center, whether the current system integrity value of the managed device in received information coincides with a pre-saved system integrity value of the managed device in the management center based on the received information and said integrity list, and determining that an unknown attack on the managed device exists and performing alert processing if they do not coincide with each other, wherein said managed device is a computer, and the step of said managed device acquiring and saving its own current system integrity value upon its startup comprises the steps of:
   i) calculating integrity values for parameter information which has been configured, master boot sector and system boot partition and storing them in a secure storage component after starting BIOS (Basic Input Output System) or EFI (Extensible Firmware Interface), wherein said parameter information includes: enable or disable status configuration of various system functions, various authentication passwords, disk configuration parameters, central processing unit microcode software, peripheral configuration parameters and configuration parameters of a security function; and
   ii) using the integrity values mentioned in the step i) as the current system integrity value.

2. The method according to claim 1, wherein said alert processing comprises issuing alert information, or issuing alert information and restoring damaged parameters, data, files and software.

3. The method according to claim 1, wherein
   said integrity list further comprises application software equipped to each managed device and integrity value of the application software; and
   said method further comprises steps of:
   calculating, by the managed device, the integrity value of application software and sending information containing a current integrity value of the application software to the management center before starting the application software; and
   determining, by the management center, whether a received system integrity value of the application software currently used by the managed device coincides with a pre-saved system integrity value of the application software corresponding to the managed device in the management center based on the received information and said integrity list, and issuing alert information, or issuing alert information and restoring the damaged application software if there is no coincidence.

4. The method according to claim 1 or 3, further comprising the steps of:
   saving in advance, by said management center, at least one of a list of OS (Operating System) versions and a list of application software versions, wherein said list of OS versions contains integrity values for different versions of different OSs and the correspondence between integrity values for different versions of one same OS, said list of application software versions contains integrity values for different versions of different application software and the correspondence between integrity values for different versions of one same application software; said list of OS versions further contains patches corresponding to OS versions having security vulnerability, and said list of application software versions further contains patches corresponding to application software versions having security vulnerability;
   said step a) further comprises sending to the management center information containing a current integrity value for at least one of an OS version and an application software version currently used by the managed device;
   said step b) further comprises determining at least one of the OS version and the application software version currently used by the managed device based on the current integrity value for at least one of the OS version and the application software version from the managed device as well as at least one of said list of OS versions and said list of application software versions, determining whether there is any security vulnerability in at least one of the OS version and the application software version based on a preset configuration, and, if it is determined that there is any security vulnerability in at least one of the OS version and the application software version, issuing alert information and sending to the managed device the patch corresponding to at least one of the OS version and the application software version.

5. The method according to claim 1, wherein said information containing the current system integrity value in the step a) is a plain text of the current system integrity value.

6. The method according to claim 1, wherein said information containing the current system integrity value in the step a) is an encrypted text obtained by encrypting the current system integrity value with a preset symmetrical key; and before said determining by the management center based on the received information and said integrity list, the step b) further comprises decrypting the received information with a preset symmetrical key.

7. The method according to claim 1, wherein said information containing the current system integrity value in the step a) is combined information of a plain text of the current system integrity value and information obtained by signing the current system integrity value with a pre-generated private key; and before said determining by the management center based on the received information and said integrity list, the step b) further comprises verifying a signature on the current system integrity value with a pre-saved public key corresponding to said pre-generated private key.

8. The method according to claim 1, wherein said information containing the current system integrity value in the step a) is combined information of a plain text of the current system integrity value, information obtained by signing the current system integrity value with a pre-generated private key, and a pre-generated public key certificate corresponding to said pre-generated private key and signed by a trusted third party; and before said determining by the management center based on the received information and said integrity list, the step b) further comprises verifying a signature on the current system integrity value with a received public key.

9. The method according to claim 1, wherein said information containing the current system integrity value in the step a) is combined information of a plain text of the current system integrity value, information obtained by signing the current system integrity value with a pre-generated private key, a pre-generated public key corresponding to said private key, and an anonymous certificate; and before said determining by the management center based on the received information and said integrity list, the step b) further comprises authenticating an identity of a sender with a received anonymous certificate and verifying a signature on the current system integrity value with a received public key after a successful authentication.

10. The method according to claim 1, wherein said managed device is a computer, and the step of said managed device acquiring and saving its own current system integrity value upon its startup further comprises the steps of:

iii) calculating integrity values for system ROM (Read-only Memory), BIOS (Basic Input Output System) or EFI (Extensible Firmware Interface) firmware code and hardware configuration parameters and storing them in a secure storage component after powering on the computer;

iv) calculating integrity value for OS-loaded code and storing it in a secure storage component before loading a boot OS by BIOS or EFI; and v) calculating integrity values for OS core, system startup file, system configuration file and driving software and storing them in a secure storage component after loading code by OS, and wherein the step ii) is replaced by the step of calculating the current system integrity value based on all the integrity values mentioned in the steps i) and iii) to v).

11. The method according to claim 10, wherein said secure storage component is secure chip TPM (Trusted Platform Module), hard disk with security protection function, USB-key or smart-card.

* * * * *

UNITED STATES PATENT AND TRADEMARK OFFICE
CERTIFICATE OF CORRECTION

PATENT NO. : 8,533,829 B2  Page 1 of 1
APPLICATION NO. : 11/817194
DATED : September 10, 2013
INVENTOR(S) : Wei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this
Fifteenth Day of September, 2015

Michelle K. Lee
*Director of the United States Patent and Trademark Office*